US007571090B2

(12) United States Patent
Kinney

(10) Patent No.: US 7,571,090 B2
(45) Date of Patent: Aug. 4, 2009

(54) EMULATING A HOST ARCHITECTURE IN GUEST FIRMWARE

(75) Inventor: Michael D. Kinney, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 669 days.

(21) Appl. No.: 10/954,622

(22) Filed: Sep. 30, 2004

(65) Prior Publication Data

US 2006/0069534 A1 Mar. 30, 2006

(51) Int. Cl.
*G06F 9/455* (2006.01)

(52) U.S. Cl. ................................ 703/26; 703/27; 718/1

(58) Field of Classification Search .................. 703/26, 703/27; 718/1
See application file for complete search history.

(56) References Cited

U.S. PATENT DOCUMENTS 7,225,436 B1 * 5/2007 Patel .......................... 717/139
7,451,443 B2 * 11/2008 Lowell et al. .................. 718/1
7,478,388 B1 * 1/2009 Chen et al. ..................... 718/1
2003/0061497 A1 * 3/2003 Zimmer ...................... 713/189
2005/0246453 A1 * 11/2005 Erlingsson et al. ............. 710/1
2005/0246718 A1 * 11/2005 Erlingsson et al. .......... 719/317

* cited by examiner

*Primary Examiner*—Paul L Rodriguez
*Assistant Examiner*—Juan C Ochoa
(74) *Attorney, Agent, or Firm*—Schwegman, Lundberg & Woessner, P.A.

(57) ABSTRACT

Systems and methods provide for emulating a host architecture in guest firmware. One aspect of the systems and methods comprises determining whether an emulated instruction would cause a transition into a legacy mode. A current execution context is converted into a legacy mode context, and the firmware emulator proceeds to a group of legacy mode instructions in a native mode for the processor. The firmware emulator detects an end instruction and converts the legacy context back to the guest firmware context.

10 Claims, 4 Drawing Sheets

EMULATING A HOST ARCHITECTURE IN GUEST FIRMWARE

FIELD

The inventive subject matter relates generally to guest firmware systems, and more particularly to systems and methods for emulating a host architecture in guest firmware.

BACKGROUND

The evolution of computer hardware and software continues at a rapid pace, with each evolution typically producing new features, better performance or more economic operation. For example, over time processor architectures for personal computers have become faster, and have evolved from eight bit, to sixteen bit, to thirty-two bit to the present day sixty-four bit processor architectures.

One design choice in hardware or software architectures is whether the new architecture will support software designed for previous architectures. The choice typically involves a tradeoff between performance and market acceptability. For example, providing support for executing software designed for previous architectures typically increases the complexity of the design and typically results in a decrease in performance when executing software designed for previous architectures. However, not providing such support may cause the new architecture to be less desirable in the marketplace, because there may be vast amounts of previously installed software that may not run on the new architectures. For example, there are vast numbers of computer systems and software that require legacy BIOS (Basic Input Output System), legacy option ROMs, legacy OS (Operating System) loaders, and older operating systems such as DOS, Microsoft Windows® 3.1, Microsoft Windows 95 and Microsoft Windows 98.

One mechanism used in previous systems to provide support for previous architectures is referred to as emulation. In emulation, a processor or processors run in their native mode and interpret the instructions of the previous mode. In previous systems, emulators have been provided as applications running on top of an operating system, or within an operating system itself. This type of emulation is typically not available until the system has been booted. Software executed during the boot process cannot be emulated in these systems.

The above described issues are multiplied in a virtual machine environment. In a virtual machine environment, multiple operating systems may execute on a single hardware system, with each operating system appearing to have full control of the hardware system. Each operating system running in a virtual machine environment is referred to as a "guest" operating system.

In one system designed to support a virtual machine environment with multiple guest operating systems, each time an instruction in a legacy mode is detected, a software emulator executes a single instruction and returns control back to the guest operating system. This incurs the overhead of saving and restoring the entire guest CPU state for each instruction executed. The can result in significant performance penalties.

DETAILED DESCRIPTION

In the following detailed description of exemplary embodiments of the invention, reference is made to the accompanying drawings that form a part hereof, and in which is shown by way of illustration specific exemplary embodiments in which the inventive subject matter may be practiced. These embodiments are described in sufficient detail to enable those skilled in the art to practice the various embodiments of the invention, and it is to be understood that other embodiments may be utilized and that logical, mechanical, electrical and other changes may be made without departing from the scope of the inventive subject matter. The following detailed description is, therefore, not to be taken in a limiting sense.

In the Figures, the same reference number is used throughout to refer to an identical component which appears in multiple Figures. Signals and connections may be referred to by the same reference number or label, and the actual meaning will be clear from its use in the context of the description.

Figure 1:
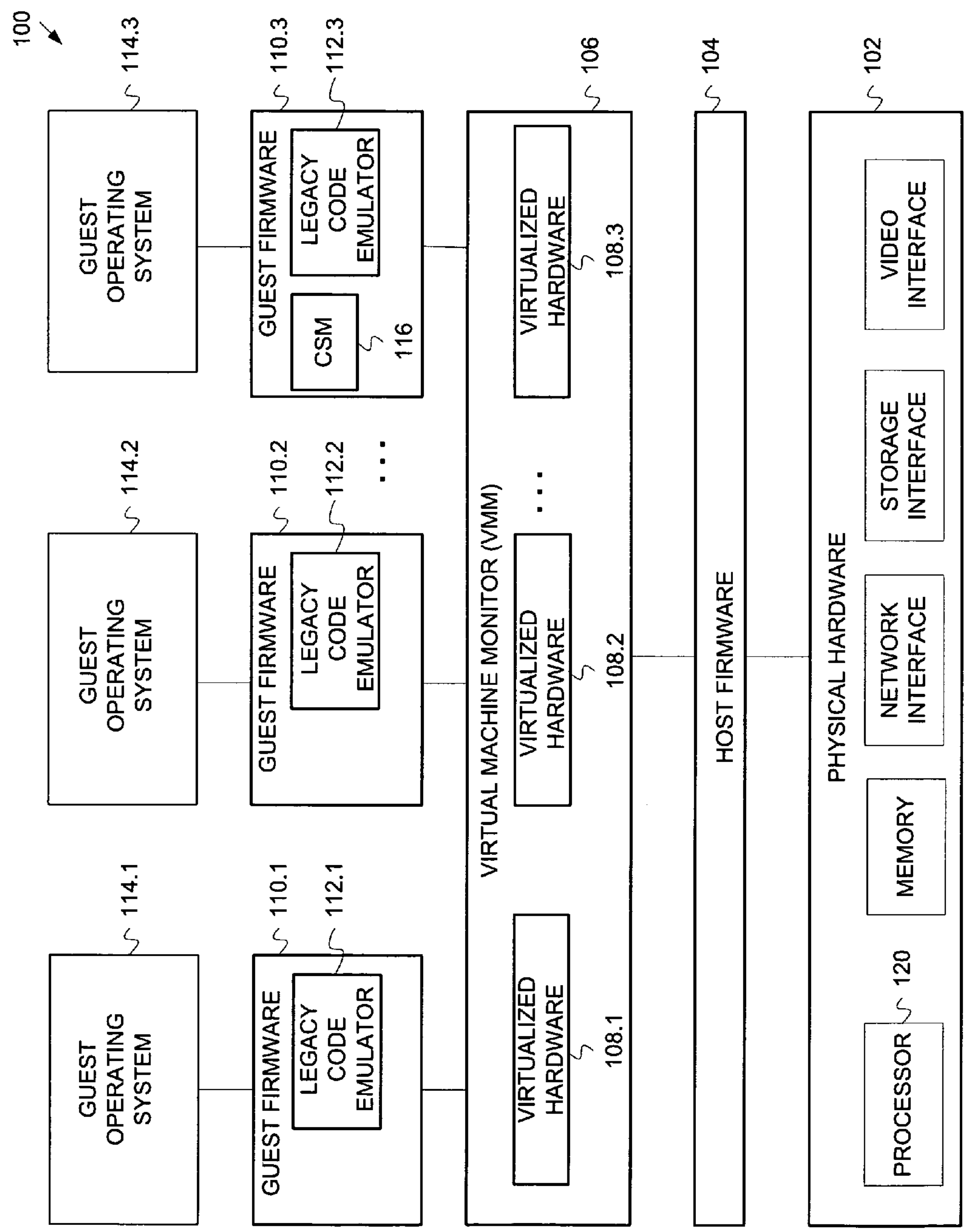
FIG. 1 is a block diagram showing hardware and software components of a system incorporating embodiments of the invention.

FIG. 1 is a block diagram of the major components of a hardware and software operating environment 100 incorporating various embodiments of the invention. The systems and methods of the various embodiments of the invention may be incorporated on any hardware or software system that can support a virtual machine mode of operation. Generally such hardware may include personal computers, server computers, mainframe computers, laptop computers, portable handheld computers, set-top boxes, intelligent appliances, personal digital assistants (PDAs), cellular telephones and hybrids of the aforementioned devices. In some embodiments of the invention, operating environment 100 includes physical hardware 102, host firmware 104, virtual machine monitor (VMM) 106, guest firmware 110 and guest operating systems 114.

Physical hardware 102 may include any of the hardware components typically included in a computer system. Such components include one or more processors, memory (including ROM, RAM, flash memory, compact flash memory), network interfaces (wired and wireless), storage interfaces (e.g. to hard drives, CD-ROM drives, DVD-ROM drives etc.) and video interfaces. In some embodiments of the invention, processor 120 may be a processor from the Itanium® family of processors available from Intel Corporation, Santa Clara, Calif. In alternative embodiments, the processor may be a processor in the Pentium® or Celeron® family of processors also available from Intel Corporation. However, the embodiments of the invention are not limited to any particular type of processor.

Host firmware 104 comprises machine executable code designed to provide a direct interface to physical hardware 102. Examples of such firmware include BIOS firmware and EFI(Extensible Framework Interface) firmware.

Virtual machine monitor (VMM) 106 presents to guest firmware 110 and guest operating systems 114 an abstraction of one or more virtual machines (VMs). Each VM may function as a self-contained platform, running its own guest operating system 114. In some embodiments, VMM 106 exports a virtualized hardware interface 108 to such higher-level software. Virtualized hardware interface 108 provides an interface and resources that appears to guest firmware 110 and guest operating system 114 as "real" hardware that is solely controlled by the associated guest firmware or guest operating system. In other words, the guest operating system is typically not aware (and does not need to be aware) that it is sharing the physical hardware with other guest operating systems 114. The virtualized hardware interface 108 then maps and translates operations from the virtual hardware to the physical hardware 102 through host firmware 104. The VMM 106 may be implemented, for example, in hardware, software, and firmware, or by a combination of various techniques. In some embodiments VMM 106 may utilize VMX (Virtual Machine eXtensions) processor extensions to an IA-32 instruction set architecture which provide added support for virtual machines. In these embodiments, VMM 106 verifies every instruction fetch and data access while the processor is executing in big real mode (a processor mode similar to real mode, but with a four gigabyte addressing range).

Guest firmware 110 provides a firmware interface between a guest operating system 114 and virtualized hardware 108. The guest firmware interface may be similar to the interface provided by host firmware 104, except the guest firmware interfaces with virtualized hardware rather than physical hardware. In some embodiments, guest firmware may provide a BIOS interface. In alternative embodiments, guest firmware 110 may provide an EFI compliant interface. The embodiments are not limited to a particular interface.

Legacy architecture emulator 112 is a component of guest firmware 110 that provides emulation capability for guest firmware 110 and guest operating system 114. In some embodiments, legacy architecture emulator 112 emulates an Intel IA-32 instruction set architecture, including support for protected mode, real mode, and big real mode memory access modes.

In some embodiments, guest firmware 110 includes Compatibility Support Module (CSM) 116 that provides support for legacy Option ROMs and legacy Operating Systems. In particular embodiments, CSM 116 includes support for Int86( ) and FarCall86( ) services, which can result a transition from protected mode execution to 16-bit real mode execution. The 16-bit real mode code may choose to then transition to big real mode. Since it can not be predicted when a transition to big real mode may occur, CSM 116 assumes that every call to Int86( ) or FarCall86( ) may use big real mode. Legacy code emulator 112 can be implemented as part of the guest firmware 110, so the real mode and big real mode instructions may be executed with the emulator.

In particular embodiments, legacy code emulator 110 may be implemented as a native DXE (Driver Execution Environment) driver within a framework such as the Intel Platform Innovation Framework for EFI. The Intel Platform Innovation Framework for EFI comprises a set of architectural interfaces to enable BIOS and EFI providers to produce differentiated platform designs. In these embodiments, legacy code emulator actually executes in a native mode (e.g. Protected Mode). Execution in a native mode is desirable due to the improved memory protection and access, multitasking support and faster code execution that is typically provided in native mode.

Guest operating system 114 may comprise any operating system now known or developed in the future that may run as guest in a virtual machine environment. Examples of such operating systems include Windows® 95, Windows 98®, Windows Me®, Windows CE®, Windows® NT, Windows 2000®, and Windows XP® by Microsoft Corporation. However, the embodiments of the invention are not limited to any particular operating system, and in alternative embodiments the software components may operate within the Palm OS® from Palm Inc., variants of the UNIX and Linux operating systems and cellular telephone operating systems.

In general, the embodiments of the invention operate as follows. Software such as guest operating system 114, a boot loader for guest operating system 114, guest firmware 110, or software on an option ROM, legacy BIOS, or other software module at some point requires emulation of a legacy mode of operation. Legacy code emulator 112 provides the emulation in the guest firmware 110. Rather than make a transition to the VMM 106 for instruction emulation, the emulator 112 establishes a current operation context, establishes a new context according to the legacy mode, and continues execution in the native mode, thereby avoiding the performance degradation associated with transitions to the VMM 106 as each instruction is emulated.

Further details on methods executed within legacy code emulator 112 are provided below.

Figure 2:
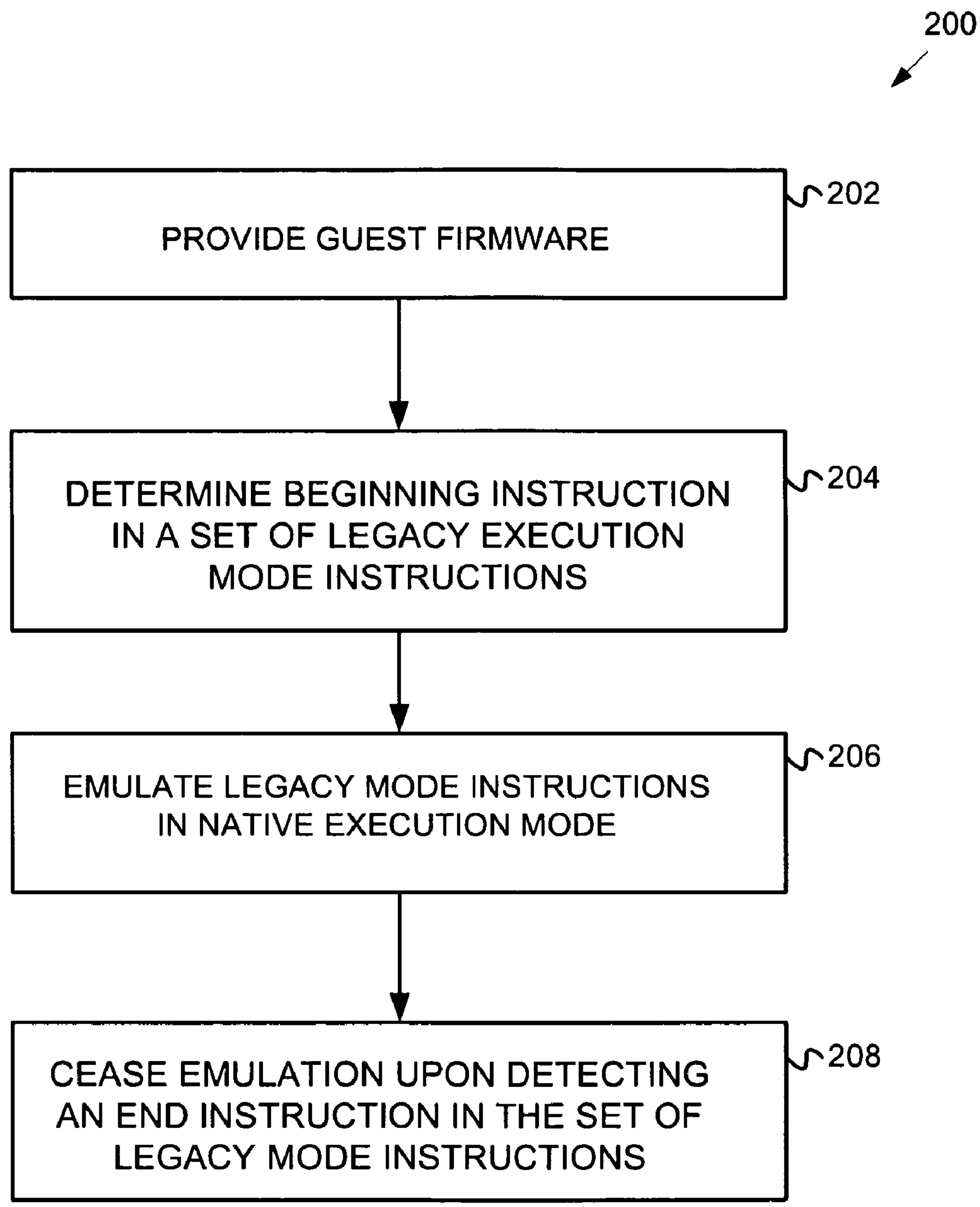
FIG. 2 is a flowchart illustrating a method for emulating a host architecture in guest firmware according to embodiments of the invention.
Figure 3A:
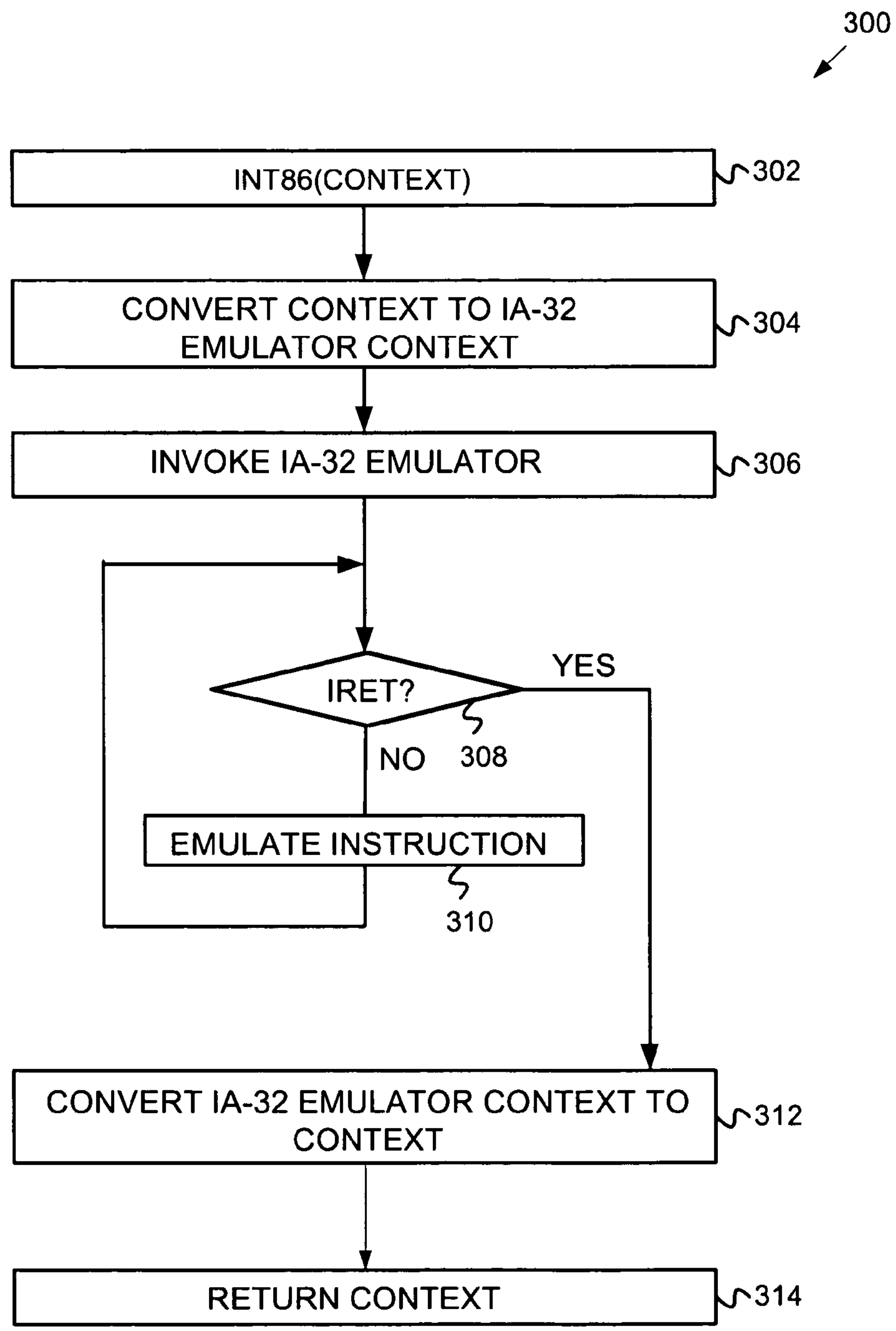
FIG. 3A is a flowchart illustrating a method for emulating an interrupt in guest firmware according to embodiments of the invention.
Figure 3B:
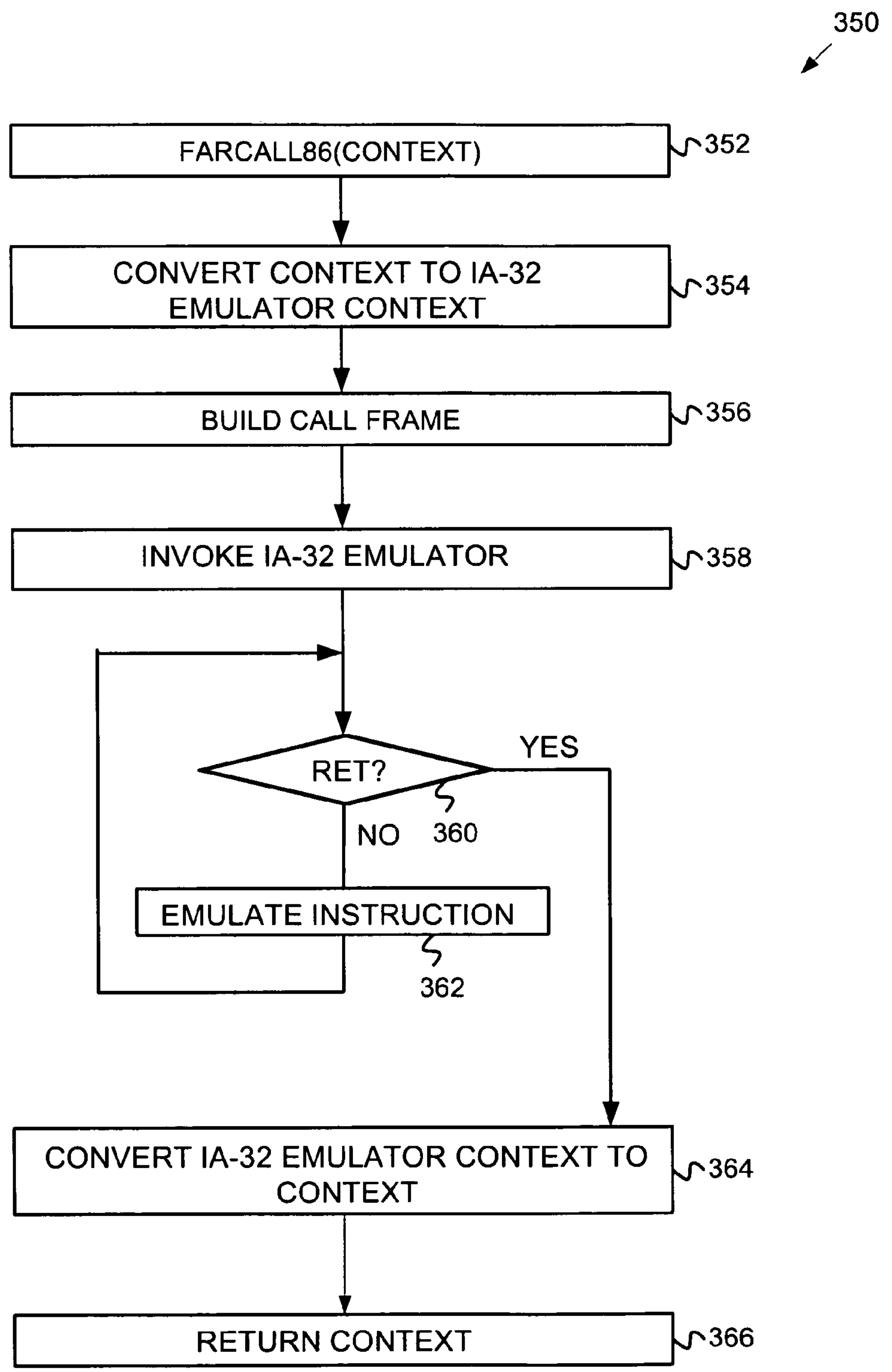
FIG. 3B is a flowchart illustrating a method for emulating subroutine call in guest firmware according to embodiments of the invention.

FIGS. 2, 3A and 3B are flowcharts illustrating methods for emulating a host architecture in guest firmware. The methods may be performed within an operating environment such as that described above with reference to FIG. 1. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from machine-readable media such as RAM, ROM, CD-ROM, DVD-ROM, flash memory etc.). The methods illustrated in FIGS. 2, 3A and 2B are inclusive of the acts performed by an operating environment executing an exemplary embodiment of the invention.

FIG. 2 is a flowchart illustrating a method 200 for emulating a host architecture in guest firmware according to embodiments of the invention. The method begins by providing a guest firmware component having a native execution mode (block 202). In some embodiments, the guest firmware component runs in a native execution mode of an Itanium processor or Pentium processor.

Next, software executing within the guest firmware determines that an instruction would cause a transition to a legacy mode of operation (block 204). In some embodiments, the determination may be made by executing a particular function, subroutine or method. In particular embodiments, the legacy mode of operation is the big real mode of the IA-32 instruction set architecture.

The guest firmware then emulates the execution of set of legacy mode instructions (block 206). However, rather than transition to the legacy mode, the guest firmware executes the instructions in the native execution mode processor (for example, protected mode).

Finally, the guest firmware ceases emulation upon detecting an end instruction of the set of instructions executable in the legacy execution mode (block 208). In some embodiments of the invention, the guest firmware detects an "IRET" instruction (an interrupt return) or a "RET" (return from subroutine) instruction.

Further details regarding particular embodiments of the invention that provide for IA-32 instruction set emulation will now be provided with reference to FIGS. 3A and 3B.

FIG. 3A is a flowchart illustrating a method 300 for emulating an interrupt in guest firmware according to embodiments of the invention. The method begins when an INT86 interrupt service is called or invoked (block 302). The INT86 service may result in a transition to big real mode. A guest firmware processor context is passed into the INT86 service.

Next, the guest firmware context is converted from a format that the guest firmware uses to a legacy context format that the legacy code emulator (here an IA-32 emulator) can use. For example, registers, interrupt stack pointers and interrupt stack frames may need conversion. This may include setting up code segment and data segment registers for the emulator context.

Next the IA-32 emulator is invoked to emulate the instructions processed by the INT86 service (block 306). The emulator checks each instruction prior to execution to determine if an IRET instruction is to be executed (block 308). If the instruction to be emulated is not an IRET, the emulator proceeds to emulate the current instruction in the processor's native mode (block 310), and the method returns to block 308 to examine the next instruction.

Otherwise, if an IRET instruction is found, then the emulator causes the emulated legacy context to be converted back into the native guest framework context (block 312). This context is returned and the guest firmware execution continues (block 314). The guest firmware can examine the results of the INT86 service by examining the guest firmware context and the returned call frame.

FIG. 3B is a flowchart illustrating a method 350 for emulating a subroutine call in guest firmware according to embodiments of the invention. The method begins when a FarCall86 service is called or invoked (block 352). Like the INT86 service, a guest firmware processor context is passed into the service.

Next, the guest firmware processor context converted from a format that the guest firmware uses to a legacy context format that the IA-32 Emulator can use (block 354). Like the conversion at block 304, this may involve the conversion of register, interrupt stack pointer and interrupt stack frame values.

Additionally, a call frame containing stack arguments for the subroutine called by the FarCall86 service is built (block 356).

Next the IA-32 emulator is invoked to emulate the instructions processed by the FarCall86 service (block 358). The emulator checks each instruction prior to execution to determine if an RET (e.g. subroutine return) instruction is to be executed (block 360). If the instruction to be emulated is not a RET, the emulator proceeds to emulate the current instruction in the processor's native mode (block 362), and the method returns to block 360 to examine the next instruction.

Otherwise, if a RET instruction is found, then the emulator causes the emulated legacy context to be converted back into the native guest framework context (block 364). This context is returned and the guest firmware execution continues (block 366). The guest firmware may examine the results of the FarCall86 service by examining the guest firmware context and the returned call frame.

Systems and methods for emulating legacy mode instructions in guest firmware have been described. The embodiments of the invention provide advantages over previous systems. For example, the systems and methods of various embodiments of the invention are able emulate groups of instructions in a native mode rather than transitioning to the legacy mode. This reduces the number of expensive context shifts that are often made in previous systems.

Although specific embodiments have been illustrated and described herein, it will be appreciated by those of ordinary skill in the art that any arrangement which is calculated to achieve the same purpose may be substituted for the specific embodiments shown. Thus while specific examples have been provided regarding a IA-32 instruction set architecture, the systems and methods of the embodiments of the invention may be mapped onto any number of firmware architectures to potentially improve the performance of guest firmware. This application is intended to cover any adaptations or variations of the inventive subject matter.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that the inventive subject matter be limited only by the following claims and equivalents thereof.

What is claimed is:

1. A system comprising:

a processor and a memory;

a virtual machine monitor executable by the processor and the memory and operable to provide a set of one or more virtualized hardware components;

a set of one or more guest firmware components operable to interface with the set of one or more virtualized hardware components; and a legacy code emulator coupled to the one or more guest firmware components and operable to:

determine a beginning instruction of a set of one or more instructions executable in a legacy execution mode, emulate execution in the native execution mode of the set of one or more instructions executable in the legacy execution mode, and cease emulation upon detecting an end instruction of the set of instructions executable in the legacy execution mode;

wherein emulation of the one or more instructions executable in the legacy execution mode does not result in a transition to the virtual machine monitor.

2. The system of claim 1, wherein the legacy code emulator operates in a protected mode.

3. The system of claim 1, wherein the legacy execution mode comprises a big real mode of an IA-32 architecture.

4. The system of claim 1, wherein the beginning instruction comprises a call to an interrupt service and the end instruction comprises an interrupt return instruction.

5. The system of claim 4, wherein the legacy code emulator is operable to convert a guest firmware context to a legacy mode interrupt context.

6. The system of claim 1, wherein the beginning instruction comprises a call to a subroutine service and wherein the end instruction comprises a subroutine return instruction.

7. The system of claim 6 wherein the legacy code emulator is further operable to convert a guest firmware context to a legacy mode subroutine context.

8. The system of claim 1, further comprising a set of one or more guest operating systems associated with the one or more guest firmware components.

9. The system of claim 8, wherein a boot loader for the operating system is operable to cause the legacy code emulator to be invoked.

10. The system of claim 1, wherein software executable on an option ROM is operable to cause the legacy code emulator to be invoked.

* * * * *

UNITED STATES PATENT AND TRADEMARK OFFICE

CERTIFICATE OF CORRECTION

PATENT NO. : 7,571,090 B2
APPLICATION NO. : 10/954622
DATED : August 4, 2009
INVENTOR(S) : Michael D. Kinney It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1221 days.

Signed and Sealed this

Seventh Day of September, 2010

David J. Kappos
*Director of the United States Patent and Trademark Office*